United States Patent [19]
Rouverol

[11] Patent Number: 5,083,474
[45] Date of Patent: Jan. 28, 1992

[54] ZERO TRANSMISSION ERROR GEARING

[75] Inventor: William S. Rouverol, Berkeley, Calif.

[73] Assignee: Axicon Gear Company, Berkeley, Calif.

[21] Appl. No.: 710,004

[22] Filed: Jun. 4, 1991

[51] Int. Cl.$^5$ .................. F16H 55/14; F16H 55/06
[52] U.S. Cl. .................................... 74/461; 74/462
[58] Field of Search ............................ 74/461, 462

[56] References Cited
U.S. PATENT DOCUMENTS

| | | | |
|---|---|---|---|
| 4,276,785 | 7/1981 | Rouverol | 74/462 |
| 4,644,814 | 2/1987 | Rouverol | 74/462 |
| 4,651,588 | 3/1987 | Rouverol | 74/462 |
| 4,899,609 | 2/1990 | Nagata | 74/462 |

FOREIGN PATENT DOCUMENTS 521076 7/1921 France .

OTHER PUBLICATIONS

"Profile Modification to Minimize Spur Gear Dynamic Loading", Lin et al., NASA TM89901, 9/88.
"The Reduction of Gear Pair Transmission Error by Minimizing Mesh Stiffness Variation", Rouverol et al., AGMA 88FTM 11, 10/88.
"Design of High Contact Ratio Gears", Rosen et al., J. Am. Helicopter Society, 27M4, 10/82.

Primary Examiner—Dirk Wright

[57] ABSTRACT

The usual expedient employed by gear designers seeking to reduce gear noise at all loads has been to specify finer teeth, which in effect trades away torque capacity for quietness. The present disclosure describes a tooth form that substantially eliminates gear noise while at the same time significantly increasing torque capacity. This tooth form involves (a) the synchronization of the loading and unloading phases of tooth engagement with the inverse phases (i.e., unloading and loading phases, respectively) of another tooth pair, combined with (b) the introduction of particular patterns of topographic tooth surface crowning that transform the elastic tooth pair stiffness curve into a curve that not only maintains this synchronization at loads greater or smaller than the design load but also eliminates transmission error to any extent desired. As neither feature (a) nor (b) requires fine teeth, the tooth form may be employed with any number of teeth, and this allows specification of the "critical tooth number" that maximizes torque capacity.

37 Claims, 5 Drawing Sheets

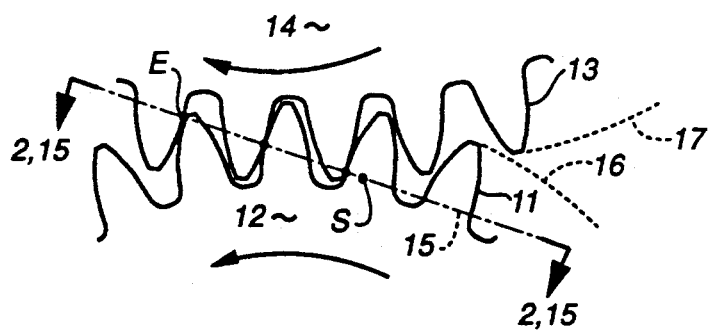
FIG._1
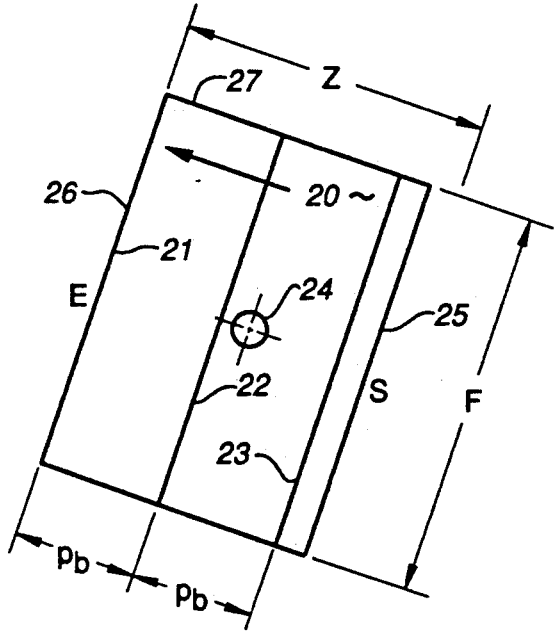
FIG._2
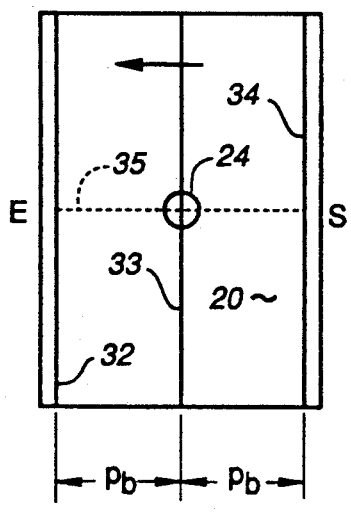
FIG._3
(CC POSITION)
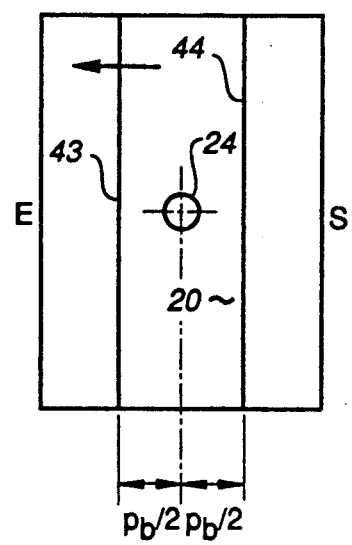
FIG._4
(CS POSITION)

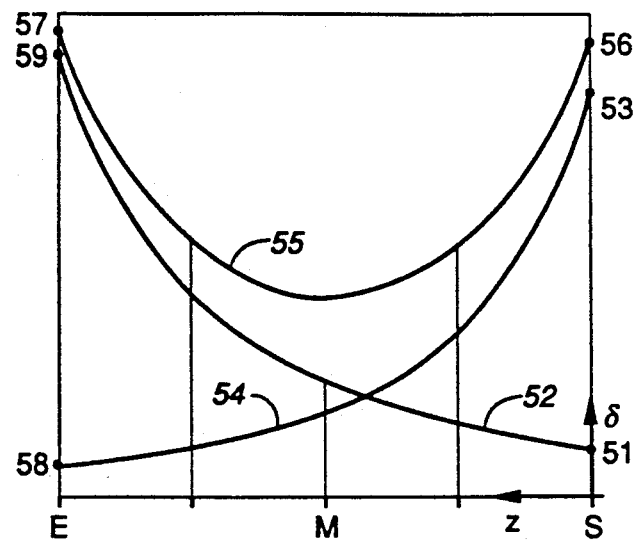
FIG._5
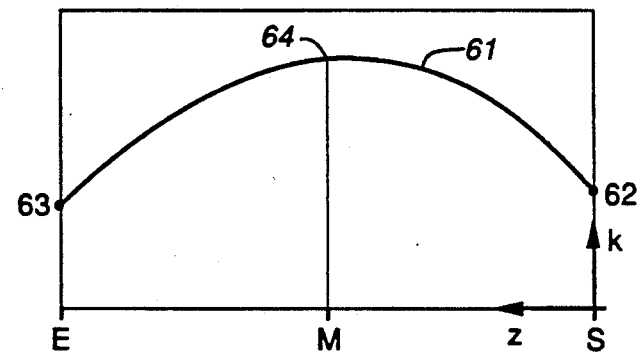
FIG._6
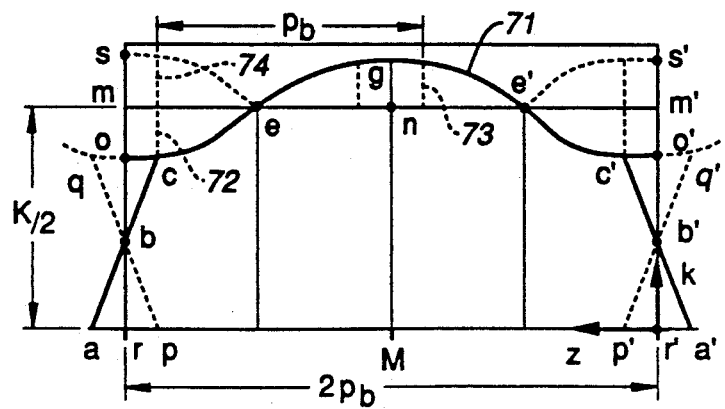
FIG._7

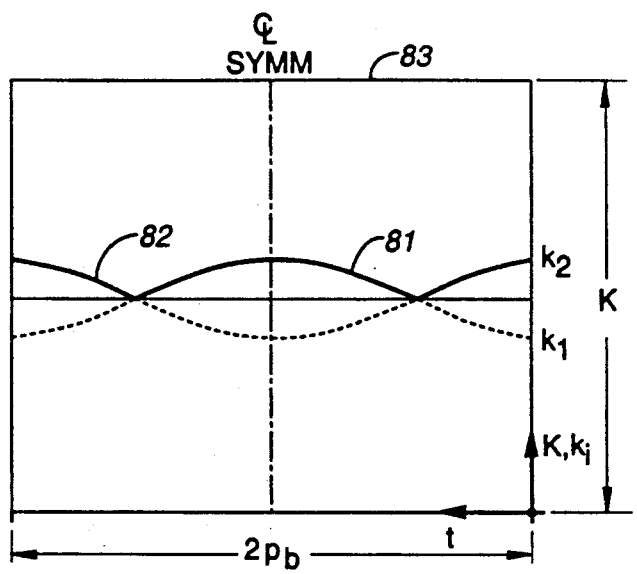
FIG._8
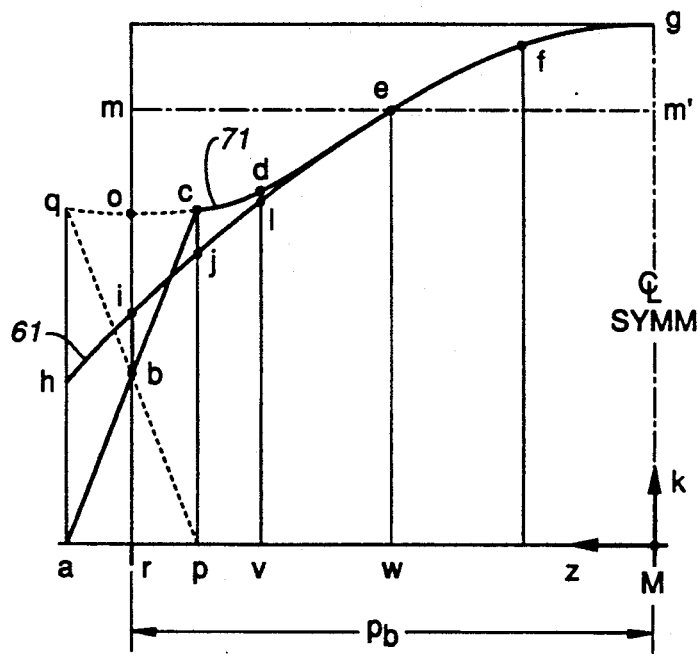
FIG._9
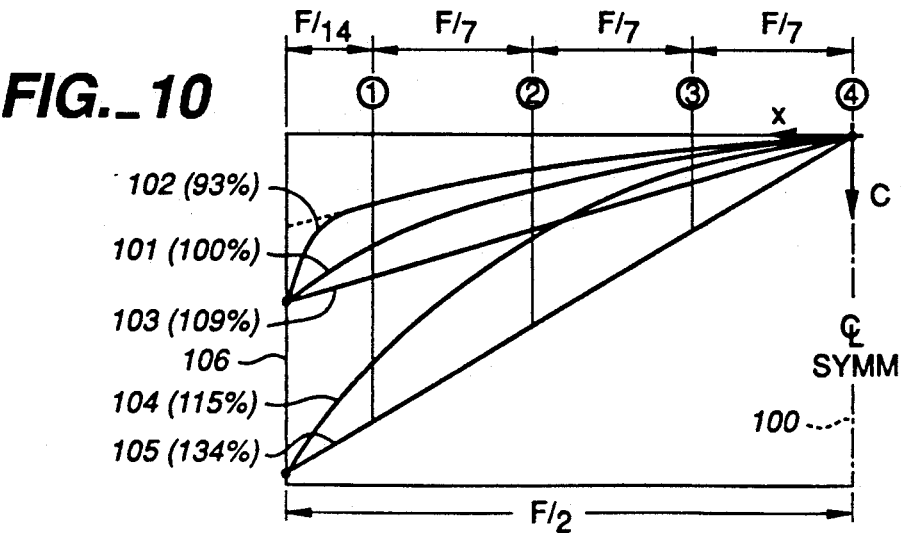
FIG._10

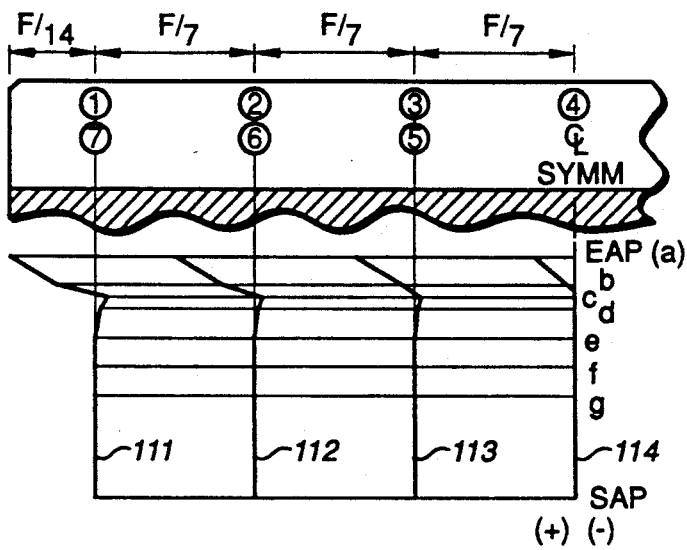
FIG._11
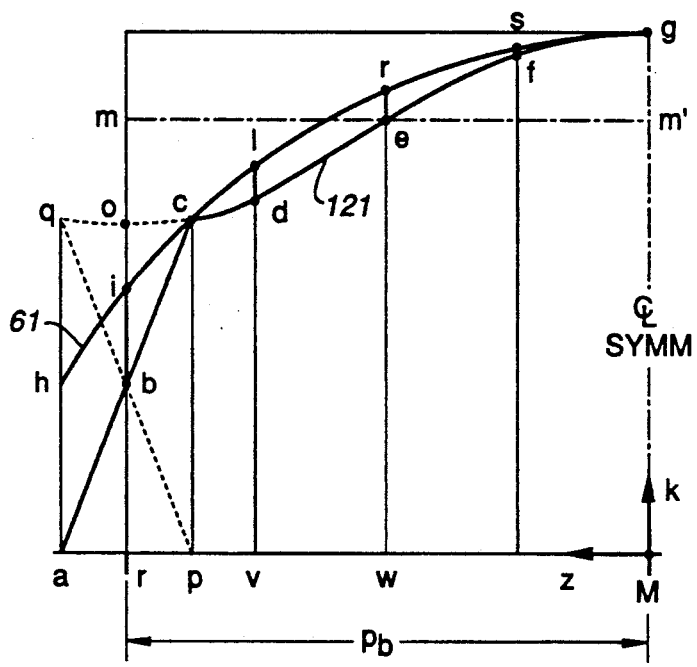
FIG._12
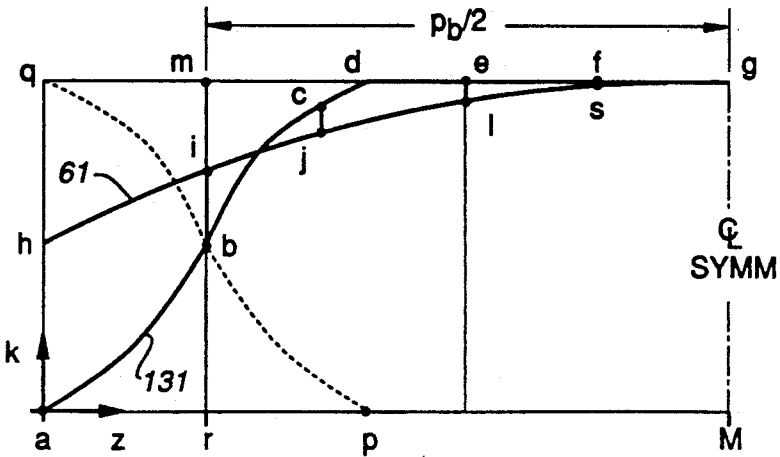
FIG._13

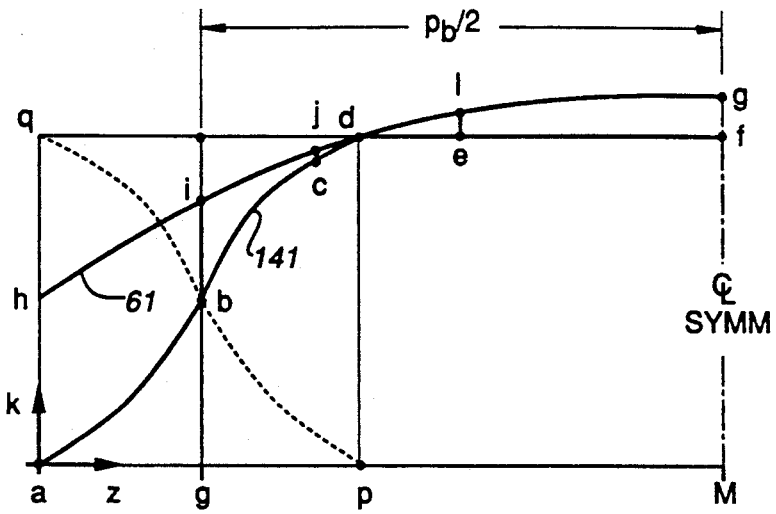
FIG._14
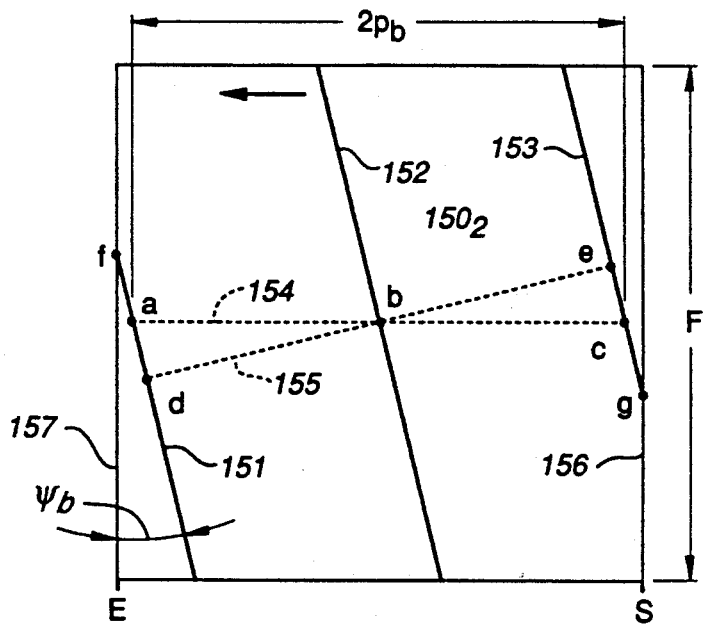
FIG._15
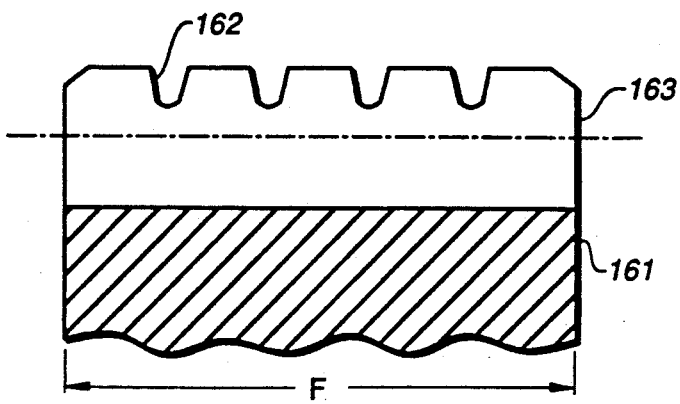
FIG._16

ZERO TRANSMISSION ERROR GEARING

This invention relates to the shape of gear teeth. Specifically it relates to the utilization of particular gear tooth characteristics that minimize operating noise and vibration over a wide range of loads, while also affording torque capacity that is greater than that of conventional gearing. The invention comprises additions to and improvements on the concepts disclosed in U.S. Pat. No. 4,651,588 (hereinafter Reference 1) and "The Reduction of Gear Pair Transmission Error by Minimizing Mess Stiffness Variation", by W. S. Rouverol and W. J. Pearce, AGMA Paper 88FTM11 (hereinafter Reference 2).

Conventional power train gearing has the limitation that the relief given to the teeth to compensate for tooth deflection under load is correct only for one particular load, the so-called "design load." At loads smaller than the design load the teeth are considerably over-relieved. If the service involves only one operating condition, as is the case for example with a gear set used to transmit power from an induction motor to a pump or blower, this narrowness of the optimal load range is not a problem. In many other applications, however, such as machine tool or vehicular propulsion drives, the transmitted torque varies greatly, often covering the full range from zero to full torque in either direction.

The standard expedients employed by gear designers to provide quietness over a wide range of loads have been to improve the gear finish and to make the teeth finer. Both of these expedients increase cost, the improved finish because it involves additional high-accuracy processes such as grinding, lapping, honing, etc., and finer teeth because they reduce torque capacity and therefore require a compensating increase in gear size and weight.

Accordingly, the object of the present invention is to disclose a grear form that will reduce noise and vibration without the usual trade-off of reduced torque capacity, and to achieve this reduced noise and vibration at all torque loads from zero to full load. This and other objects and advantages of the invention will be evident from the drawings as explained in the specification that follows:

FIG. 1 is partial section of a pair of mating gears embodying the invention, taken perpendicularly to the dirction of motion (i.e.,) "transversely").

FIG. 2 is a view in the direction 2—2 of FIG. 1, showing the field of contact across which the lines of contact between engaged teeth move as the gears rotate. If the gear axes are parallel the field of contact is usually rectangular, as shown, and if the helix angle is zero, as for example in spur gears, the lines of contact are parallel to the end boundaries of the field.

FIGS. 3 and 4 are diagrams of the field of contact of FIG. 2 turned counter-clockwise by the transverse pressure angle to afford an orthogonal view. In these two figures the lines of contact are shown in two successive positions displaced transversely by one half of a base pitch distance.

FIG. 5 is a graph showing how single tooth elastic deflections for pinion and gear teeth, and their sum (the "transverse tooth pair elastic deflection") vary with distance along the path of contact for a typical standard involute spur gear pair.

FIG. 6 is a graph of elastic tooth pair stiffness for the gear pair of FIG. 5, showing how the stiffness curve has a reciprocal relation to the tooth pair deflection curve.

FIG. 7 is a graph of an ideal tooth pair stiffness curve, including the loading and unloading ramps.

FIG. 8 is a diagram showing how an ideal tooth pair stiffness curve which undulates with a wave length of twice the base pitch, as shown in FIG. 7, adds to that for adjacent tooth pairs to produce a substantially constant mesh stiffness K.

FIG. 9 is an overlay showing how the elastic tooth pair stiffness curve of FIG. 6 deviates from the ideal stiffness curve of FIG. 7. FIG. 10 is a diagram showing how the overall stiffness of a gear mesh is affected by the form and amount of crowning, with typical comparative stiffness values indicated.

FIG. 11 is a partial set of involute charts showing one method of specifying the differential crowning called for by the stiffness deviations indicated in FIG. 9.

FIG. 12 is a diagram like FIG. 9 but for an alternative tooth pair stiffness curve with all stiffness alterations being reductions in stiffness.

FIG. 13 is a diagram similar to FIG. 9 but for a spur gear pair with small tooth numbers and a synchronization length of one base pitch distance instead of two.

FIG. 14 is a diagram like FIG. 13 but for an alternative tooth pair stiffness curve with all stiffness alterations being reductions in stiffness.

FIG. 15 is a diagram analogous to that of FIG. 3, but for a helical gear pair instead of a spur gear pair.

FIG. 16 is a section through the rim of a helical gear that has transverse slots machined through the tooth tips.

In detail and referring to the drawings, FIG. 1 is a tansverse section through typical teeth 11, 13, with arrows showing the direction of motion ("transverse direction"). Teeth 11 on the mating pair (gear 14) make contact along a path line 15 that starts at point S and ends at point E. The teeth 11, 13 may have one or more types of relief, and on at least one of the pair there is lead modification (crowning). The active heights of the teeth 11, 13 terminate at the addendum circles 16, 17 of the pinion 12 and gear 14, respectively. Other features of pinion 12 and gear 14, such as hubs, webs, rims, keyways, etc. are standard and are omitted in the interest of clarity.

FIG. 2 is a section through FIG. 1 in the direction 2—2, showing the field of contact 20 that is the area locus of lines of contact 21, 22 between successive pairs of mating teeth 11, 13. Adjacent lines of contact 21, 22, 23 are spaced at one base pitch pb in the transverse direction. The field of contact 20 has a centroid 24, and end boundaries 25, 26 that are the loci of points S and E, respectively, at which the path of contact 15 (FIG. 1) in each transverse plane starts and ends. Boundary 25 is hereinafter referred to as the starting or "S" boundary. and boundary 26 is referred to as the end or "E" boundary. In the position shown, contact line 21 is about to leave the field 20, so it coincides with the end boundary 26. The field of contact 20 also has side boundaries 27, 28 that are spaced apart by the effective face width F when the gears are transmitting full torque. As the mating gears 12, 14 turn, the lines of contact 21, 22, 23 moves across the field of contact 20 at the same velocity, so the transverse spacing between them, of one base pitch $p_b$, is maintained.

In FIGS. 3 and 4 the field of contact 20 of FIG. 2 is turned clockwise to afford upright sequential views, for easier comparison of successive configurations of the contact lines. In these two figures the contact lines are numbered sequentially (32, 33, 34, 43, 44) in the direction opposite to the direction of motion. In addition, contact lines between the same pair of teeth (33, 43 and 34, 44) are positioned in the two figures so that a plot of the mesh stiffness for FIGS. 3 and 4 in that order, will also be points on a plot of the mesh stiffness variation with time.

It will be seen that the positions illustrated are symmetrical with respect to the field centroid 24: In FIG. 3 contact line 33 contains the field centroid 24, and this position will therefore be referred to in this specification by the acronym "CC" (Centroid Contained). Contact lines 32 and 34 are spaced at one base pitch distance $p_b$ on either side of centroid 24. In FIG. 4 contact lines 43 and 44 straddle the centroid 24, at equal distances of one-half a base pitch distance therefrom; accordingly, this position will be referred to by the acronym "CS" (Centroid Straddled). It should be noted that the specifying of the invention by reference to these symmetrical "CC" and "CS" positions is a completely arbitrary choice. Any two or more asymmetrical positions could have been used without altering the basic nature of the invention. The principal purpose of using the symmetrical positions rather than asymmetrical ones is to obtain, for purposes of both analysis and design, the clearest possible picture of the mesh stiffness conditions.

Once the main characteristics of the field of contact geometry have been defined, the next characteristic of the meshed teeth that must be considered is the tooth pair stiffness as how it varies with distance from the field centroid 24. The manner in which spur teeth deflect at various points along the path of contact S-E is shown in FIG. 5. It will be seen in FIG. 1 that when the contact point is close to the point S of initial engagement, (assuming pinion 12 is driving), the load point is close to the base of the pinion tooth 11. This causes the deflection of that tooth as shown by points 51 on curve 52 in FIG. 5 to be very small. The load on the gear tooth 13, on the other hand, is near its tip, so the deflection of that tooth, as shown by point 53 on curve 54, is very large. The total deflection, or "tooth pair" deflection, is the sum of the pinion and gear tooth deflections and is shown by curve 55, from which it is apparent that at the start of contact S the tooth pair deflection 56 is governed primarily by the deflection of the gear tooth 13.

Similarly, as will also be evident from FIG. 1, when the tooth loading point is near the end of the contact path 15, at point E, the inverse is true, and the total tooth pair deflection 57, which is the sum of the deflection 58 of the gear tooth 13 and the deflection 59 of the pinion tooth 11, is governed primarily by the large deflection 59 of the latter. This increased compliance of the mating teeth at the end boundaries 25, 26 of the field of contact 20 (FIG. 2) is mainly attributable to the fact that cantilever bending deflection varies as the cube of the cantilever length. Other deflection components are also important, however, such as that attributable to shear, Hertzian compression, tooth base rotation and shear, and gear body torsional wind-up. The combined effect of all these deflection components gives a tooth pair elastic deflection curve 55 that is approximately parabolic (i.e., second order). While curve 55 can be obtained by manual calculation, it is infinitely more practical to obtain it with the aid of a high-speed computer.

Since stiffness is the reciprocal of deflection per unit load, the tooth pair stiffness curve 61 shown in FIG. 6 may readily be obtained from curve 55 in FIG. 5. Typically the elastic tooth pair stiffness 64 at the field centroid (e.g., 24 in FIGS. 2, 3 and 4 and corresponding point M of FIGS. 5 and 6) is two to three times as great as that at the end boundaries S and E. (The effect of tip relief on curve 61 is to steepen the slope at the right and left ends and to shorten the transverse length of the curve at reduced load.)

The essential characteristics of the invention as applied to one kind of spur gearing are disclosed in FIGS. 7 through 11. Curve 71 in FIG. 7 plots tooth pair stiffness k as a function of transverse displacement z and is what will be referred to in this specification and the ensuing claims as an "ideal" or "zero transmission error" (ZTE) tooth pair stiffness curve, as differentiated from curve 61 of FIG. 6, which is a typical unmodified elastic tooth pair stiffness curve. Curve 71 is given the designation "ideal" because all sets of two or more ordinates spaced at one base pitch of transverse displacement add to a constant sum K, hereinafter referred to as the "mesh stiffness." The curve 71 is not unique, since small variations in ordinates and slopes are allowable, provided the variations are ones that in combination give to the curve the necessary characteristics.

The main characteristics of curve 71 are as follows: (1) a fairly steeply sloped portion a-c at the left, called in this specification the "loading ramp;" (2), an undulating central portion c-g-c', which includes two concave upward segments c-e and c'-e' and two concave downward segments e-g and e'-g; and (3), a fairly steeply sloped portion c'-a' at the right, called the "unloading ramp." The entire curve 71 is substantially symmetrical about its centerline g-M, so the ramps a-c and a'-c' have right-left symmetry, preferably within 5 or 10% with respect to both slope and the ordinates at c and c'. The loading ramp a-c is substantially bisected by the unloading ramp q-p of another similar tooth pair stiffness curve, as is the unloading ramp a'-c' by the loading ramp p'-q', and the intersection points b and b' of these overlaid loading and unloading ramps are points with respect to which each ramp has polar symmetry. In addition, the points b and b' are displaced transversely by two base pitch lengths, and this displacement is referred to in this specification as the "synchronization length." It will be evident that the profile contact ratio will be greater than 2.0 by the horizontal length of the ramp portion of curve 71 measured in base pitch units (a-p or a'-p' divided by $p_b$), since the ramp symmetry requirement ensures that a-r, r-p, p'-r' and r'-a' are all substantially equal.

The undulating central portion c-g-c' also has some requirements. If the central segment e-e' is made identical to the central segment of curve 61 in FIG. 6 (as it often will be to reduce the design calculations), then the objective of keeping the mesh stiffness K constant requires that curve segments o-e and o'-e' be transposed mirror images of segments g-e' and g-e, respectively. In effect, the segment g-e' will have been transposed leftward by one base pitch length to position e-s, then reflected across the constant stiffness line m-m'. Similarly, segment e-g will have been transposed rightward to position e'-s' and reflected across line m-m' to give segment e'-o'. Given these transpositions and reflections, typical stiffness deficiency increment 72 will always be equal to stiffness increment 74 which is in turn equal to the stiffness excess increment 73, and as these deficiency and excess increments are displaced transversely by one base pitch (FIGS. 2, 3 and 4), the mesh stiffness, because it is the algebraic sum of the tooth pair stiffness of all the tooth pairs that occupy the field at any given moment, will be constant. This characteristic is shown in FIG. 8, where the undulating curve 81 for which the tooth pair stiffness is $k_1$ has ordinates that add to those $k_2$ of another tooth pair stiffness curve 82 that lags it by half a wave length (one base pitch distance) to produce a constant sum K (83) for the mesh. Curve 81 is made up of the central portion c-g-c' curve 71 of FIG. 7 with two substantially straight segments o-c and c'-o' added to its ends. It should be noted that the similarity of curves 81 and 82 in FIG. 8 to sine and cosine curves respectively should not be misunderstood. The curve segments e-g and g-e', for example, may have many forms, including circular arcs, segments of a parabola or ellipse, polynomials, etc. The only requirement is that whatever curve forms may be employed, they must be given the transverse displacements and symmetrical reflections described above.

When curves 61 in FIG. 6 and 71 in FIG. 7 are superimposed, the construction of FIG. 9 is obtained. Since curve segments e-g and g-e' may have any desired form as noted above, we may elect to make them identical to the corresponding portions of the actual tooth pair stiffness curve 61 (FIG. 6). Thus the superimposed curves, 61 and 71 are identical between points e and e', but diverge outside of this zone: segment e-o of curve 71 is concave upward, while segment e-h of curve 61 is concave downward. In addition, the ramp portion a-c of curve 71 is much steeper than the analogous segment h-j of curve 61. To transform segment e-h of curve 61 into curve segments a-c and c-e of curve 71 requires that curve 61 have its ordinate h-a reduced to zero, its ordinate r-i reduced by about 30% (stiffness increment i-b), it ordinate p-j increased by about 20% (stiffness increment j-c), and its ordinate v-l increased about 5% (stiffness increment l-d). This is preferably accomplished, according to the invention, by what is called in this specification "differential crowning," as explained in connection with FIG. 10.

FIG. 10 diagrams several forms of crowning that may be used on gear teeth. In most applications crowning is symmetrical about the central plane of the gear, so only the left half of the crowning curves (101-105) are shown, with the amount of crowning C plotted as a function of the distance x from the central plane 100 of the gear, for half the width of the gear F/2. The most common form of crowning is a simple parabolic curve 101. Almost as common is a "compound crowning" curve 102, which consists of a parabolic central portion with short supplementary parabolic segments used to increase the amount of crowning at each end face 106 of the gear. Other crowning curves are shown, including straight (V-shaped) crowning (103), doubled parabolic (104), and doubled straight (105).

The most significant feature of the diagram of FIG. 10 appears as a set of percentage figures shown in parentheses after each of the crowning types. These percentage figures indicate how the mesh deflections for equal transmitted torques compare to that (100%) of "regular crowning" (101). These percentage figures show clearly that the mesh stiffness can be readily increased or decreased by amounts comparable to the stiffness increments i-b, j-c and l-d in FIG. 9. Accordingly, it is a main concept of the present invention that "differential crowning" be used to transform curve 61 in FIG. 9 into curve 71 on a point-by-point basis that specifies an appropriate form and amount of crowning at each roll angle. For example, since ordinate r-i of the elastic tooth pair stiffness curve 61 has an excess stiffness increment i-b of about 35%, the regular crowning of the gear pair as a whole is altered at the roll angle corresponding to point r in FIG. 9 by specifying crowning such as the straight crowning 105 (134%) shown in FIG. 10. Similarly, the increased stiffness called for at point j, of about 20% (increment j-c), can be provided by utilizing compound crowning of the type shown as curve 102 (93%) in FIG. 10, but with an even flatter central parabola as needed to achieve the necessary 20% increase in stiffness. Point d on curve 71 can likewise be obtained by compound crowning but since only a 5% increase in stiffness (increment l-d) is needed, slightly smaller crowning values C than those shown for curve 102 would be specified.

It will be evident that an alternative to curve 105 would be curve 104 with the tooth-end crowning a bit more than double the amounts shown. Depending on what stiffness characteristics are sought at part load, most designs will employ crowning curves that are additive combination of curves 104 and 105.

The tooth working surface modifications called for in this specification come under what are generally called "topographic modifications." One way to specify the special pattern of modifications herein proposed is by a series of involute charts depicting profiles equally spaced along the faces of the gears. A set of such charts 111-114 is shown in FIG. 11. (As in the case of FIG. 10, symmetry of the modifications with respect to the central plane of the gear is assumed, so only the profile charts for the center and left half of the tooth are shown. Asymmetrical designs are of course also possible.) The involute chart for the central plane is shown at 114. It will be seen that it is straight (in effect specifying a pure involute profile) from the start of active profile (SAP) up to the point b, which is the profile point at the particular roll angle that corresponds to point b, the midpoint of the ramp a-c in FIG. 9. This long straight portion of the central tooth profile 114 mates with an analogous straight portion of the central involute chart for the mate to the gear being specified in FIG. 11. The combined effect of the two straight portions is to produce the modification-free line 35 in FIG. 3, and ensures that as the torque load is reduced, the ramp intersection points b, b' will not be lowered in a manner that destroys the ramp symmetry needed to maintain synchronization of the tooth pair loading and unloading.

It will be noted further that the chart line 114 bends sharply to the left at b, up to the end of active profile (EAP) where the roll angle is the same as at point a on FIG. 9. This relatively short steep tip relief will also be present on the mate, as it will also, although slightly displaced, on the other involute charts 113, 112 and 111. The amount of this tip relief should equal or slightly exceed the calculated mesh deflection at full load.

If there are seven involute charts spaced apart by axial distances of F/7 (the number seven of course being arbitrary), and the differential crowning is according to the diagrams of FIGS. 9 and 10, then the modifications used to produce the desired crowning at profiles a distance F/7 to the left and right of chart line 114 will be those shown on chart line 113. On this line the modifications which are to be superimposed on the "regular crowning" (101 in FIG. 10) at roll angles a, b, c and d in FIG. 11 are negative (material added) at roll angles d and c and positive (material removed) at roll angles b and a. The amounts of these modification are read off of a set of crowning curves such as those shown in FIG. 10 at tansverse plane 3 located a distance F/7 to the left of transverse plane 4 (the central plane). As noted above, the particular "differential crowning" curves chosen will be those that transform curve 61 in FIG. 9 into curve 71. There is no limit to the exactitude of this transformation, since any desired number of precision points such as b, c, and d may be introduced. This is the justification for making the title of the present patent application "Zero Transmission Error" (ZTE) gearing, and because the ZTE curve has been achieved by tooth features that are essentially elastic throughout the entire synchronization length b-b', no significant disturbance in the ZTE characteristic is introduced by changes in transmitted torque.

The modifications shown for chart lines 112 and 111 that are further from transverse plane 4, at planes 2 and 6 (at 2F/7 from plane 4) and at planes 1 and 7 (at 3F/7 from plane 4), will of course be greater than those at planes 3 and 5, as is evident from FIG. 10. In no case, however, will the differential crowning specified in FIG. 11 when added to the regular crowning (101 in FIG. 10) produce a net modification that is negative (material added).

FIG. 12 shows how even the very small negative modifications at roll angles c and d in FIG. 11 may be avoided. All that is required is to use a slightly lower ZTE curve 121 that has its cusp c on line 61, and this will make all the deviations i-b, l-d, r-e and s-f reductions in stiffness, so transformation of curve 61 into ZTE curve 121 will involve only positive differential crowning modifications.

FIG. 13 is a diagram similar to FIG. 9 but for a gear pair in which the pinion has too small a tooth number to allow the synchronization length to be two base pitch lengths. In such cases, which include gear pairs for which the gear ratio is quite large or in which one member is an idler and requires increased tooth thickness to compensate for the fully reversed bending of the idler teeth, the synchronization length becomes one base pitch length. As indicated in FIG. 13 the central portion d-g of the ZTE curve 131 must be straight rather than undulating, and the mesh stiffness curve (83 in FIG. 8) is produced by a single straight horizontal component rather than two undulating components 81, 82. Aside from this, the procedure used to transform the elastic tooth pair stiffness curve into a ZTE curve 131 is exactly the same as that explained above in connection with FIGS. 7-11.

Just as FIG. 12 shows an alternative ZTE curve 121 to the ZTE curve 71 of FIG. 9, FIG. 14 shows the corresponding ZTE curve 141 that makes all the stiffness changes i-b, j-c, l-e and g-f reductions, so that all the modifications to the involute chart lines will be positive (material removed). As in the case of FIG. 12, the cusp d of the ZTE curve 141 is positioned to lie on curve 61. It should be noted in connection with the two embodiments shown in FIGS. 13 and 14 that the portion a-b of the loading ramp a-d that extends beyond the synchronization length is fairly substantial. For the proportions shown in FIG. 13 the distance a-r is about 0.2 $p_b$, and the corresponding distance in FIG. 14 is about 0.25 $p_b$. This indicates that the profile contact ratio for gear pairs having tooth pair stiffness curves such as those shown in FIGS. 13 and 14 will preferably be in the range of 1.4 to 1.6, although it is conceivable that ratios from 1.2 to 1.9 might be found useful in some applications.

Helical gears were originally developed to reduce the noise and vibration exhibited by conventional spur gears. When the static transmission error of spur gears is made to approach zero by the methods disclosed in this specification, however, it removes most or all of the justification for employing helical gears, since spur gears are inherently less expensive. If there are any applications in which helical gears might still be preferred, one of them would be gear pairs that have substantial composite misalignment (lead error plus shaft misalignment). For such applications the axial component of load that is developed in helical gears may be utilized, if the correct hand of the helix is specified, to reduce the shaft misalignment. (This assumes the misalignment is produced structurally, as by overhang, rather that by machining or mounting errors.)

For applications that appear to call of helical gearing, the features disclosed above may be adapted in the manner shown in FIG. 15. The field of contact 150 (analogous to field 20 in FIG. 3) is depicted for the CC position of the contact lines 151, 152, 153, which are moving leftward. The synchronization length is two base pitch lengths, and the modification-free line 154 extends from point c on contact ine 153 to point a on contact line 151. In order to reduce Hertz stress at the outer ends of lines 153 and 151, which the "buttress effect" described in References 1 and 2 would otherwise introduce, substantial tip relief is employed on both the pinion and gear tooth profiles. This relief should preferably extend only from point c to the S boundary (156) and from point a to the E boundary (157). To provide tooth length to accommodate this tip relief, contact line 153 is extended from point c to point g, and contact line 151 from point a to point f. This in turn requires the profile contact ratio to be larger than 2.0. Ratios in the range 2.15 to 2.55, and preferably 2.20 to 2.40, are optimal, just as they are for spur gears. A fairly small helix angle should be used (smaller than 20°, and preferably smaller than 15°), in order to ensure that contact line segments c-g and a-f are long enough to give effective mitigation of the buttress-induced stresses.

The tooth pair stiffness curves for helical gears are quite similar to those shown for spur gears in FIGS. 7, 8, 8 and 12. The only differences would be that because the contact lines enter and leave the field of contact 150 at its corners, ramps analogous to a-c, a'-c', q-p and q'-p' of FIGS. 9 and 12 will have much more of an S-shape than those for spur gears, with points a and q shifted leftward and points c and p shifted rightward. The requirements with respect to ramp symmetry will remain the same as for spur gears. Effective use of differential crowning to produce the stiffness changes that transform curve 61 into ZTE curve 71 will in the case of helical gears call for the crowning curves analogous to those of FIG. 10 to be in the helix direction rather than the axial direction.

One minor variation to the specifications of FIG. 15 for helical gears may be noted: If the composite misalignment is fairly small, an alternative modification-free line 155, extending in the normal direction from point e to point c, is feasible. This would of course then become the base line from which the differential crowning curves originate (FIG. 10).

Helical gear pairs for which the pinion has a small number of teeth are treated in the same manner as equivalent spur gears. FIGS. 13 and 14 would apply, but with the ramps a–d having a more pronounced S-shape, and contact line 152 in FIG. 15 would be omitted so that the synchronization length becomes one base pitch length. The contact line position represented would then be the CS position, analogous to FIG. 4, instead of the CC position. The preferred profile contact ratios would be the same as for spur gears.

It should be noted that the concepts explained in this specification could also be applied to wide-faced helical gears. In such gears the synchronization length would be an integral number of *axial* pitch lengths, so the face contact ratio will be larger than an integer by the axial length of the ramp (loading or unloading) divided by the axial pitch. The ramps will be at the ends of the teeth, with the ramp effect *beyond* the ends of the synchronization length being provided by relief as in the case of spur or narrow-faced helical pears, and the ramp portion *within* the synchronization length being achieved primarily or entirely by elastic means, namely differential crowning, again as in the case of spur or narrow-faced helical gears. In wide-faced helical gearing the modification-free line that connects the lines of contact that contain the ramp midpoints (corresponding to lines 154 or 155 in FIG. 15) will be oriented substantially in the axial direction.

A word of caution with regard to wide-faced helical gears: If the gear face is very wide, the combination of misalignment, lead error and pinion torsional wind-up (called "composite misalignment" in this specification) can prevent the corrected tooth pair stiffness curve from having the requisite characteristics for eliminating static transmission error embodied in curves such as 71 in FIG. 9, 121 in FIG. 12, 131 in FIG. 13 and 141 in FIG. 14. Manual alignment can help, but only to a degree since composite misalignment can be so much larger than maximum mesh deflection.

FIG. 16 shows a section through the rim of a helical gear 161 in which a series of transverse grooves 162 have been machined through the tip of the teeth 163. This feature may be found useful in some applications to reduce the buttress effect and the increased Hertz stresses produced by that effect. Tip slots of the type shown in FIG. 16 allow tooth numbers and profile contact ratios of helical gears to be reduced about 5 or 10%, which affords a small increase in bending strength. The disadvantage is of course that slotting requires an extra machining operation.

Although the present specification has described how the transmission error of parallel-axis external gears may be eliminated, it should be appreciated that the concepts that comprise the invention may be applied to any gear form, including parallel-axis internal, bevel, spiral bevel, and all types of non-coplanar axis and non-involute gearing. In addition to power train gearing, the ZTE concept has special utility in antibacklash gear forms, because of the detrimental effect of transmission error in such gearing. For example, gear pairs in which backlash is eliminated by tapering the teeth slightly, in the manner shown in French Patent 521,076 but with a light spring-loading of one gear axially into its mate, will run very noisily because small amounts of transmission error induce pronounced axial vibrations. The elimination of the transmission error of course cures the problem. Similarly, in the most widely used form of antibacklash gearing, known as "scissor gearing," the noise level tends to be high because of the high level of internally circulating power. As in the case of tapered tooth antibacklash gearing, the elimination of transmission error again affords an almost complete cure.

The most relevant forms of prior art gearing known to the applicant are those previously listed as References 1 and 2. The primary distinction of the disclosures in the present specification from these references lies in the introduction of the concept of a symmetrical ramp. The addition of a ramp to the tooth pair stiffness curve inevitably raises the profile contact ratio to number substantially higher than the integer values proposed in References 1 and 2. Also, the concept of utilizing differential crowning to transform the elastic tooth pair stiffness curve into a ZTE curve also goes beyond the disclosures of these references.

The most relevant prior art by others appears to be the disclosures of a paper entitled "Design of High Contact Ratio Gears," by Rosen, K. M. and Frint, H. K., published in the Journal of the American Helicopter Society, (27 n4 Oct. 1982), hereinafter Reference 3. The design procedure proposed in this paper in effect produces a synchronization of the loading and unloading of tooth pairs, but only for one particular "total normal transmitted load" on which the amount of tip relief is based. For the sample design given in this reference the profile contact ratio is 2.32, which would call for a length of profile modification of 6.9% of the path length (or total active roll angle) if a "modification-free line" of two base pitch lengths is to be provided. The length of profile modification recommended appears from FIGS. 13, 15 and 16 in the reference to be approximately 28%, so the relief length is several times the value needed to afford a minimized deviation from loading-unloading synchronization over a wide range of loads. It is also evident that the most important novel feature of the invention disclosed in the present application, differential crowning having a form and amount that transforms the elastic tooth pair stiffness curve into a ZTE curve, is not contemplated.

The interdependence of the several features that characterize ZTE gearing should be noted, since various prior art gear designs may utilize one of these features but not a plurality of them. For example, the biaxially symmetrical (i.e., bilateral plus polar symmetrical) loading and unloading ramps will produce true synchronization of loading and unloading only if the modification-free line and differential crowning are both also present to maintain the polar symmetry of the ramps with respect to the intersection point b at part load.

Several observations about the invention may be made: (1) Synchronization lengths greater than two are feasible but will afford an optimal design only in unusual applications. (2) Substantial right-left symmetry of the tooth pair stiffness curve is not imperative but helps to keep the transmission error close to zero and also affords the possibility of finishing both pinion and gear with the same shaving cutter so that they have identical base pitch lengths. The parameter that has the greatest influence on the tooth pair stiffness values at the S and E boundaries is the ratio of the pinion and gear thickness at the operating pitch diameter. (3) If the critical tooth number is very small, pinion tooth numbers may be reduced by increasing the relative radius of curvature more or less in the manner suggested in Reference 3. (4) In some designs the toplands of the pinion teeth may be quite narrow. Tooth tip spin tempering or applying a copper wash before case carburizing may be used to prevent excessive tip brittleness.

In the foregoing specification and the ensuing claims the following terms are intended to have the following meanings: "substantially modification-free" means there is no modification that intrudes further into the synchronization length than one tenth of a base pitch distance; "effective tooth pair stiffness" means the elastic tooth pair stiffness corrected for the effects of the tooth modifications; "critical number of teeth" means the number of teeth on one of a gear pair that causes it to have the same service life for pitting failure as for tooth breakage.

I claim:

1. A pair of gears having mating teeth formed to engage along lines of contact that lie within a field of contact having two side boundaries spaced-apart in the axial direction and two end boundaries space apart in the transverse direction, opposed transverse profiles of said teeth contacting each other at points on path lines lying in said field at a uniform distance from one of said side boundaries, the effective tooth pair stiffness of said teeth varying as a function of the distance of said points along said path lines, the length of said path lines producing synchronization of the loading and unloading phase of each tooth pair with the unloading and loading phases, respectively, of another tooth pair, said synchronization being maintained at all loads by forming said teeth to afford a substantially modification-free continuous line extending from a first line of contact to a second line of contact, said first and second lines of contact occupying said field simultaneously and being separated from each other by the synchronization length.

2. A pair of gears according to claim 1 wherein said continuous line is entirely modification-free.

3. A pair of gears according to claim 1 or 2 wherein the elastic tooth pair stiffness of said teeth throughout at least a portion of said synchronization length is altered by differential crowning of a form and amount that substantially eliminates transmission error.

4. A pair of gears according to claim 3 wherein said stiffness of said teeth throughout the entire synchronization length is altered by differential crowning of a form and amount that substantially eliminates transmission error.

5. A pair of gears according to claim 1, 2 or 3 wherein the number of teeth on one of said pair is within three teeth, and preferably within two teeth, of the critical number of teeth for said one of said pair.

6. A pair of gears according to claim 1, 2 or 3 wherein said synchronization length is equal to an integral number of base pitch lengths.

7. A pair of gears according to claim 1, 2 or 3 wherein said synchronization length is equal to an integral number of axial pitch lengths.

8. A pair of gears according to claim 1, 2 or 3 wherein the profile contact ratio exceeds an integer by the transverse length of the loading or unloading ramp measured in base pitch units.

9. A pair of gears according to claim 1, 2 or 3 wherein the axial contact ratio exceeds an integer by the axial length of the loading or unloading ramp measured in axial pitch units.

10. A pair of gears according to claim 6 wherein said integral number is greater than one and a plot of the tooth pair stiffness curve as a function of transverse displacement in said field has a central portion that undulates.

11. A pair of gears according to claim 6 wherein said integral number is one and a plot of the tooth pair stiffness curve as a function of transverse displacement in said field has a central portion that is substantially straight.

12. A pair of gears according to claims 1, 2 or 3 wherein said tooth pair stiffness at one end of said synchronization length is within ten percent, and preferably 5%, of that at the other.

13. A pair of gears according to claim 1, 2 or 3 wherein half the transverse length of the ramp portion of said tooth pair stiffness curve is inside the synchronization length and half is outside it.

14. A pair of gears according to claim 1, 2 or 3 wherein the loading ramp portion of the tooth pair stiffness curve has right-left symmetry with respect to the unloading ramp portion.

15. A pair of gears according to claim 1, 2 or 3 wherein said tooth pair stiffness curve has a ramp portion at one end that has substantial polar symmetry with respect to its center.

16. A pair of gears according to claim 1, 2 or 3 wherein said tooth pair stiffness curve has a first ramp portion that is intersected by a second ramp portion of the tooth pair stiffness curve for another tooth pair, and the point of intersection of said first ramp portion and said second ramp portion substantially bisects both of said ramp portions.

17. A pair of gears according to claim 1, 2 or 3 wherein said synchronization length is two base pitch lengths and the profile contact ratio is between 2.15 and 2.55, and preferably between 2.20 and 2.40.

18. A pair of gears according to claim 1, 2 or 3 wherein said synchronization length is one base pitch length and the profile contact ratio is between 1.20 and 1.90, and preferably between 1.40 and 1.60.

19. A pair of gears according to claim 1, 2 or 3 wherein the ratio of the transverse tooth thickness at the operating pitch circle for the pinion to that for the gear is within 0.15 of the square root of the gear ratio.

20. A pair of gear according to claim 1, 2 or 3 wherein said synchronization length is two base pitch lengths and one of said pair does not have more than 30 teeth.

21. A pair of gears according to claim 1, 2 or 3 wherein said synchronization length is one base pitch length and one of said pair does not have more than 20 teeth.

22. A pair of gears according to claim 1 or 2 wherein the modifications have the particular values that make the mesh stiffness for the centroid-contained position exactly equal to that for the centroid-straddled position when the torque transmitted by the pinion is between thirty percent and seventy percent of the maximum operating pinion torque.

23. A pair of gears according to claim 3 or 4 wherein at least one of said pair has both regular crowning and differential crowning.

24. A pair of gears according to claim 3 or 4 wherein said differential crowning at one point of said tooth pair stiffness curve is compound crowning.

25. A pair of gears according to claim 1, 2 or 3 wherein the modifications to the pinion working surface are the same as those to the gear working surface at corresponding roll angles.

26. A pair of gears according to claim 1, 2 or 3 wherein the outermost lines of contact intersect said end boundaries at an angle.

27. A pair of gears according to claim 26 wherein tip relief is provided that substantially annuls the buttress effect.

28. A pair of gears according to claim 26 whrein said modification-free line is substantially in the normal direction.

29. A pair of gears according to claim 26 wherein the helix angle is smaller than 20 degrees, and preferably smaller than 15 degrees.

30. A pair of gears according to claim 26 wherein differential crowning is provided in the direction of the contact lines..

31. A pair of gears according to claim 26 wherein one of said pair has teeth that have transverse slots through the tooth tips.

32. A pair of gears according to claim 26 wherein a small amount of negative root relief is given to one of said pair, with at least equal tip relief given to the other of said pair.

33. A pair of gears according to claim 1, 2 or 3 wherein one of said pair is a scissor gear.

34. A pair of gears according to claim 26 wherein the teeth on both of said pair are slightly tapered in opposite directions.

35. A pair of gears according to claim 34 wherein one of said pair is spring loaded in the axial direction toward the other of said gears.

36. A pair of gears according to claim 1, 2 or 3 wherein the ramp portion outside the synchronization length is produced by tip relief.

37. A pair of gears according to claim 3 or 4 wherein the steepness of the ramp portion immediately inside the end of the synchronization length is increased by differential crowning.

* * * * *